(12) United States Patent
Ohmi et al.

(10) Patent No.: US 7,424,595 B2
(45) Date of Patent: Sep. 9, 2008

(54) SYSTEM FOR MANAGING CIRCUITRY OF VARIABLE FUNCTION INFORMATION PROCESSING CIRCUIT AND METHOD FOR MANAGING CIRCUITRY OF VARIABLE FUNCTION INFORMATION PROCESSING CIRCUIT

(75) Inventors: Tadahiro Ohmi, 1-17-301, Komegabukuro 2-chome, Aoba-ku, Sendai-shi, Miyagi 980-0813 (JP); Tatsuo Morimoto, Miyagi (JP); Akira Nakada, Miyagi (JP); Shigetoshi Sugawa, Miyagi (JP)

(73) Assignee: Tadahiro Ohmi, Miyagi (JP)

( * ) Notice: Subject to any disclaimer, the term of this patent is extended or adjusted under 35 U.S.C. 154(b) by 239 days.

(21) Appl. No.: 10/296,640

(22) PCT Filed: Jun. 6, 2001

(86) PCT No.: PCT/JP01/04758

§ 371 (c)(1),
(2), (4) Date: Nov. 27, 2002

(87) PCT Pub. No.: WO01/95099

PCT Pub. Date: Dec. 13, 2001

(65) Prior Publication Data
US 2003/0140222 A1 Jul. 24, 2003

(30) Foreign Application Priority Data
Jun. 6, 2000 (JP) .............................. 2000-210555

(51) Int. Cl.
*G06F 15/17* (2006.01)
*G06F 9/54* (2006.01)

(52) U.S. Cl. ........................... 712/31; 712/43; 712/217
(58) Field of Classification Search ................. 712/227, 712/228, 248, 31, 43, 217; 716/16
See application file for complete search history.

(56) References Cited

U.S. PATENT DOCUMENTS 5,361,373 A * 11/1994 Gilson ........................... 712/1

(Continued)

FOREIGN PATENT DOCUMENTS

JP 4-314133 11/1992

(Continued)

OTHER PUBLICATIONS

International Preliminary Examination Report.

(Continued)

*Primary Examiner*—Daniel Pan
(74) *Attorney, Agent, or Firm*—Arent Fox LLP

(57) ABSTRACT

Configuration management information having circuit configuration information for altering a circuit configuration of an FPGA (12) is stored in a memory (13), the configuration management information according to information related to an instruction group, which is supplied by a configuration management unit (11) from the outside via a signal line group (14), is read from the memory (13), and the circuit configuration of the FPGA (12) is altered according to the read configuration management information to execute processing of the instruction group so that information processing by software is replaced by information processing by hardware in real time, which increases execution speed of information processing and shortens verification time of software, enabling software development in a shorter period and with higher efficiency.

9 Claims, 9 Drawing Sheets

U.S. PATENT DOCUMENTS 5,423,000 A * 6/1995 Kimura et al. ............... 713/1
5,752,035 A * 5/1998 Trimberger ............... 717/153
6,105,105 A * 8/2000 Trimberger ............... 711/103

FOREIGN PATENT DOCUMENTS

| JP | 07-191844 | 7/1995 |
| JP | 10-320201 | 4/1998 |
| JP | 11-232079 | 8/1999 |
| JP | 11-232081 | 8/1999 |
| JP | 2000-89963 | 3/2000 |
| JP | 2000-124317 | 4/2000 |

OTHER PUBLICATIONS

Summary of Japanese Patent Office dated Mar. 14, 2006.
International Preliminary Examination Report PCT/JP01/04758.
Summary of Japanese Patent Office dated Mar. 14, 2006. 11-232081 English translation.

* cited by examiner

F I G. 5
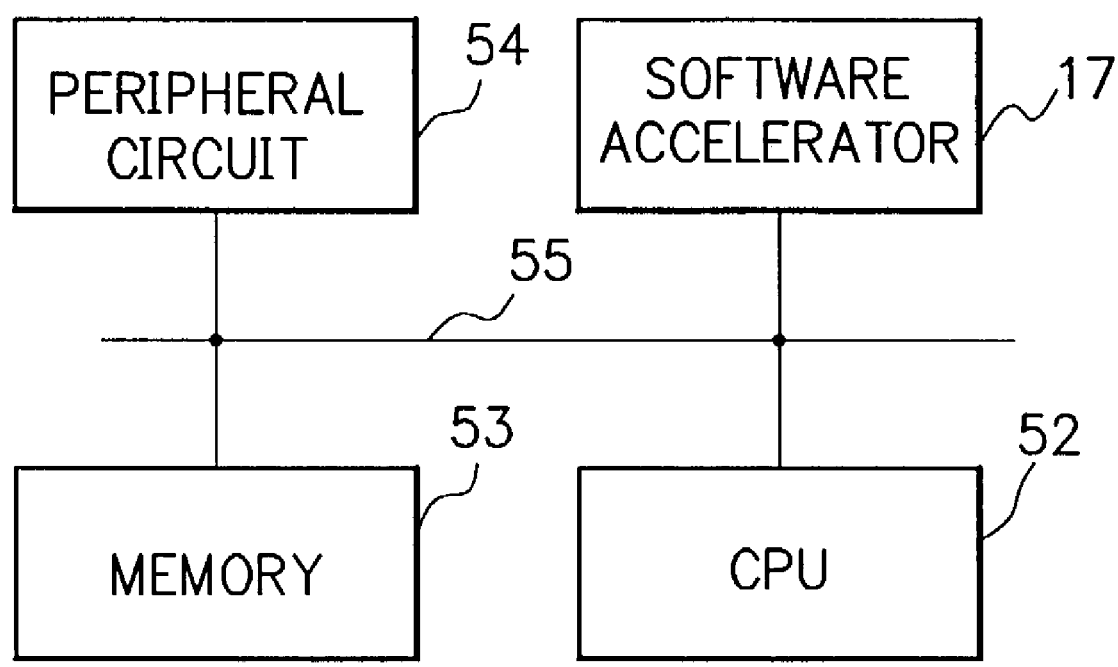

SOFTWARE

CONFIGURATION MANAGEMENT
INFORMATION GROUP

F I G. 8
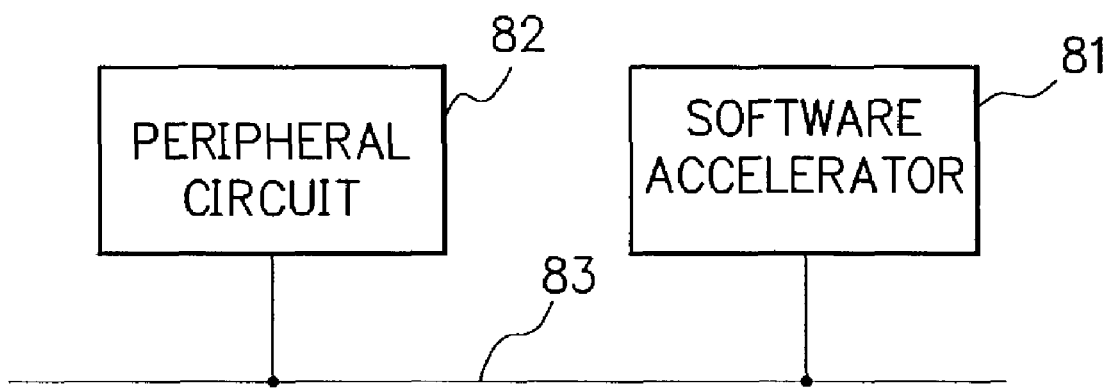

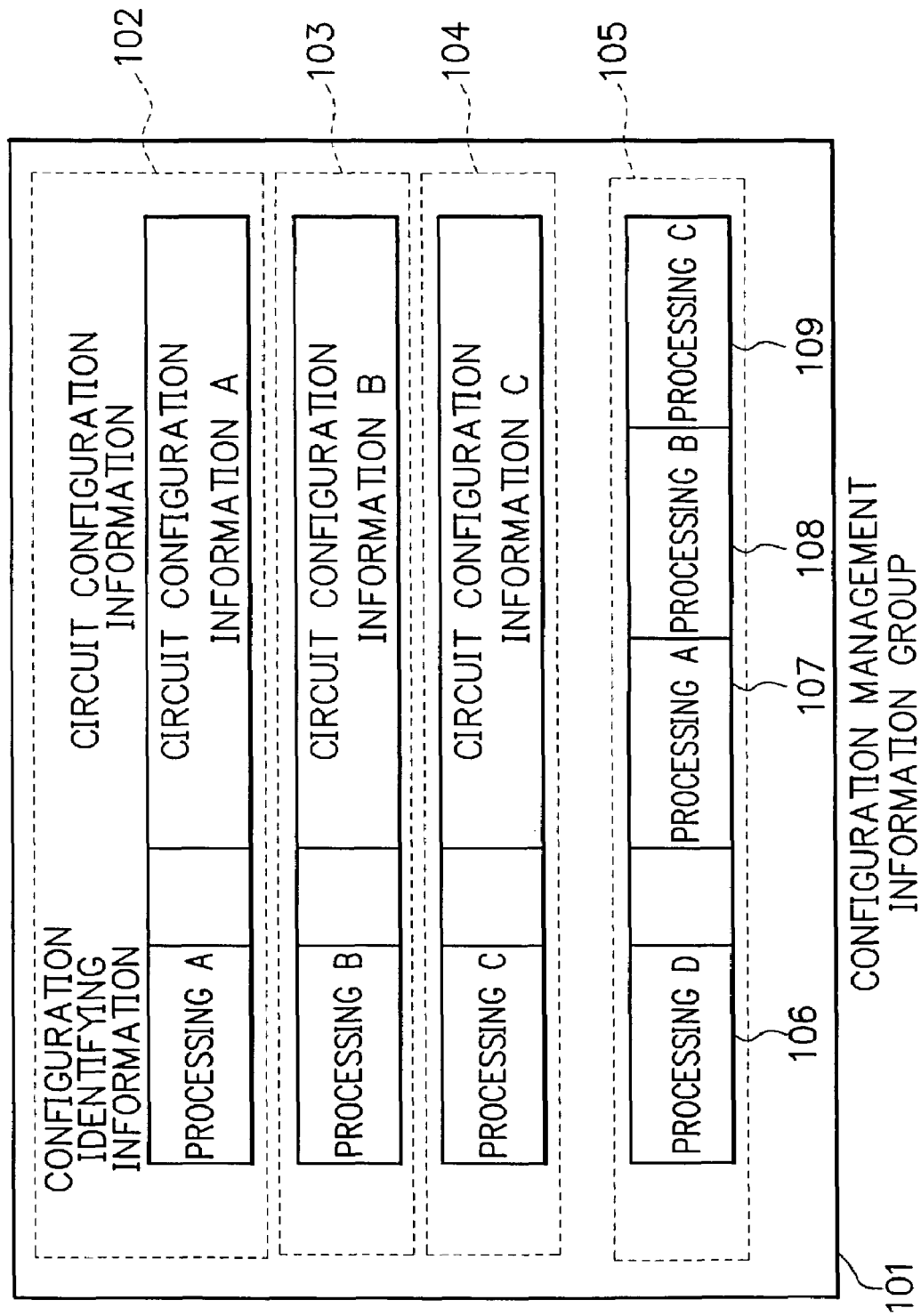

SYSTEM FOR MANAGING CIRCUITRY OF VARIABLE FUNCTION INFORMATION PROCESSING CIRCUIT AND METHOD FOR MANAGING CIRCUITRY OF VARIABLE FUNCTION INFORMATION PROCESSING CIRCUIT

TECHNICAL FIELD

The present invention relates to a system for managing a configuration of a variable function information processing circuit and a method for managing the configuration of the variable function information processing circuit.

BACKGROUND ART

Currently, in software development in system development and the like, extreme majority of manpower and a long period are required. As a result, even if there is an excellent manufacturing technology for making parts, a system, and the like with very excellent performance, most of time is occupied by development of software for operating the parts, the system, and the like made by the manufacturing technology, which leads to a situation that a period and the like from manufacturing to commercialization, shipment, delivery, and the like is thoroughly determined by quickness of the software development in developing the parts, system, and the like.

In the overall system development, the fact that the development of software of the system requires majority of manpower and time is an extremely critical problem, and it is necessary to shorten the period of the software development and increase its efficiency.

Thus, an object of the present invention is to make it possible to shorten a period and increase efficiency of software development in system development.

SUMMARY OF THE INVENTION

A system for managing a configuration of a variable function information processing circuit of the present invention is a system for managing a configuration of a variable function information processing circuit whose circuit configuration is variable according to circuit configuration information defining the circuit configuration, characterized in that it comprises: a storage part for storing configuration management information having the circuit configuration information; an information reading part for reading the configuration management information corresponding to an instruction group described in a computer language out of configuration management information stored in the storage part; and a processing executing part for altering the circuit configuration of the variable function information processing circuit according to the configuration management information read from the information reading part, and executing processing of the instruction group in the variable function information processing circuit.

Another form of the system for managing the configuration of the variable function information processing circuit of the present invention is characterized in that the configuration management information further includes input/output control information defining control of an input/output signal in a circuit configuration according to the circuit configuration information, and first configuration identifying information identifying the circuit configuration information.

Still another form of the system for managing the configuration of the variable function information processing circuit of the present invention is characterized in that the information reading part reads the configuration management information corresponding to the instruction group out of the configuration management information stored in the storage part based on the first configuration identifying information.

Yet another form of the system for managing the configuration of the variable function information processing circuit of the present invention is characterized in that the storage part stores, for each of the instruction groups, a configuration management information group composed of a plurality of the different configuration management information for each of the instruction groups, and the information reading part reads configuration management information corresponding to each of the instruction groups from the storage part.

Yet another form of the system for managing the configuration of the variable function information processing circuit of the present invention is characterized in that it further comprises a storage part for storing configuration sequence information having a configuration identifying information group grouped by sequencing a plurality of the first configuration identifying information and second configuration identifying information identifying the configuration identifying information group, in which the information reading part reads configuration sequence information corresponding to each of the instruction groups from the storage part, and further reads a plurality of configuration management information according to sequence based on the read configuration sequence information.

Yet another form of the system for managing the configuration of the variable function information processing circuit of the present invention is characterized in that, every time the configuration management information is read by the information reading part, the processing executing part alters the circuit configuration of the variable function information processing circuit according to the read configuration management information, and executes the processing of the instruction group in the variable function information processing circuit.

Yet another form of the system for managing the configuration of the variable function information processing circuit of the present invention is characterized in that the number of the variable function information processing circuit is one.

A method for managing a configuration of a variable function information processing circuit of the present invention is a method for managing a configuration of a variable function information processing circuit whose circuit configuration is variable according to circuit configuration information defining the circuit configuration, characterized in that it comprises: an information reading step of reading configuration management information having the circuit configuration information, which corresponds to an instruction group described in a computer language, from a storage part in which the configuration management information is stored; and a processing executing step of altering the circuit configuration of the variable function information processing circuit according to the configuration management information read in the information reading step, and executing processing of the instruction group.

Another form of the method for managing the configuration of the variable function information processing circuit of the present invention is characterized in that the configuration management information further includes input/output control information defining control of an input/output signal in a circuit configuration according to the circuit configuration information, and first configuration identifying information identifying the circuit configuration information.

Still another form of the method for managing the configuration of the variable function information processing circuit of the present invention is characterized in that, in the information reading step, the configuration management information corresponding to the instruction group is read from the storage part based on the first configuration identifying information.

Yet another form of the method for managing the configuration of the variable function information processing circuit of the present invention is the method for managing the configuration of the variable function information processing circuit whose circuit configuration is variable according to circuit configuration information defining the circuit configuration, characterized in that it comprises: an information reading step of reading configuration sequence information corresponding to an instruction group described in a computer language from a storage part for storing configuration management information including the circuit configuration information, input/output control information defining control of an input/output signal in a circuit configuration according to the circuit configuration information, and first configuration identifying information identifying the circuit configuration information, and the configuration sequence information including a configuration identifying information group which is grouped by sequencing a plurality of the configuration identifying information and second configuration identifying information identifying the configuration identifying information group, and of further reading a plurality of configuration management information according to sequence based on the read configuration sequence information; and a processing executing step of, every time the configuration management information is read in the information reading step, altering the circuit configuration of the variable function information processing circuit according to the read configuration management information, and executing processing of the instruction group.

According to the present invention structured as described above, the processing of the instruction group described in the computer language can be replaced by processing by the variable function information processing circuit being hardware in real time as well as the processing can be executed in a circuit configuration specified to specifications of a system, which makes it possible to increase execution speed of the processing and to shorten verification time of the processing of the instruction group which is described in the computer language, enabling software development in a shorter period and with high efficiency.

BRIEF DESCRIPTION OF THE DRAWINGS

FIG. 5 is a diagram showing one configuration example of a system in which a software accelerator 17 is used by connecting to a computer so that they can communicate with each other;

FIG. 8 is a block diagram showing a configuration example of a system to which a system for managing a configuration of a variable function information processing circuit according to a second embodiment is applied;

FIG. 10 is a diagram showing a configuration management information group 101 stored in the memory 13 in the third embodiment.

DETAILED DESCRIPTION OF THE PREFERRED EMBODIMENTS

The present invention will be explained in detail by taking examples below but it is needless to say that the present invention is not limited to these embodiments. However, characteristics, nature, and various benefits of the present invention will be further clarified by the attached drawings and subsequent detailed explanation of preferred examples.

Hereinafter, embodiments of the present invention will be explained with reference to the drawings.

First Embodiment

The structure and operation of a first embodiment of the present invention will be explained.

Figure 1:
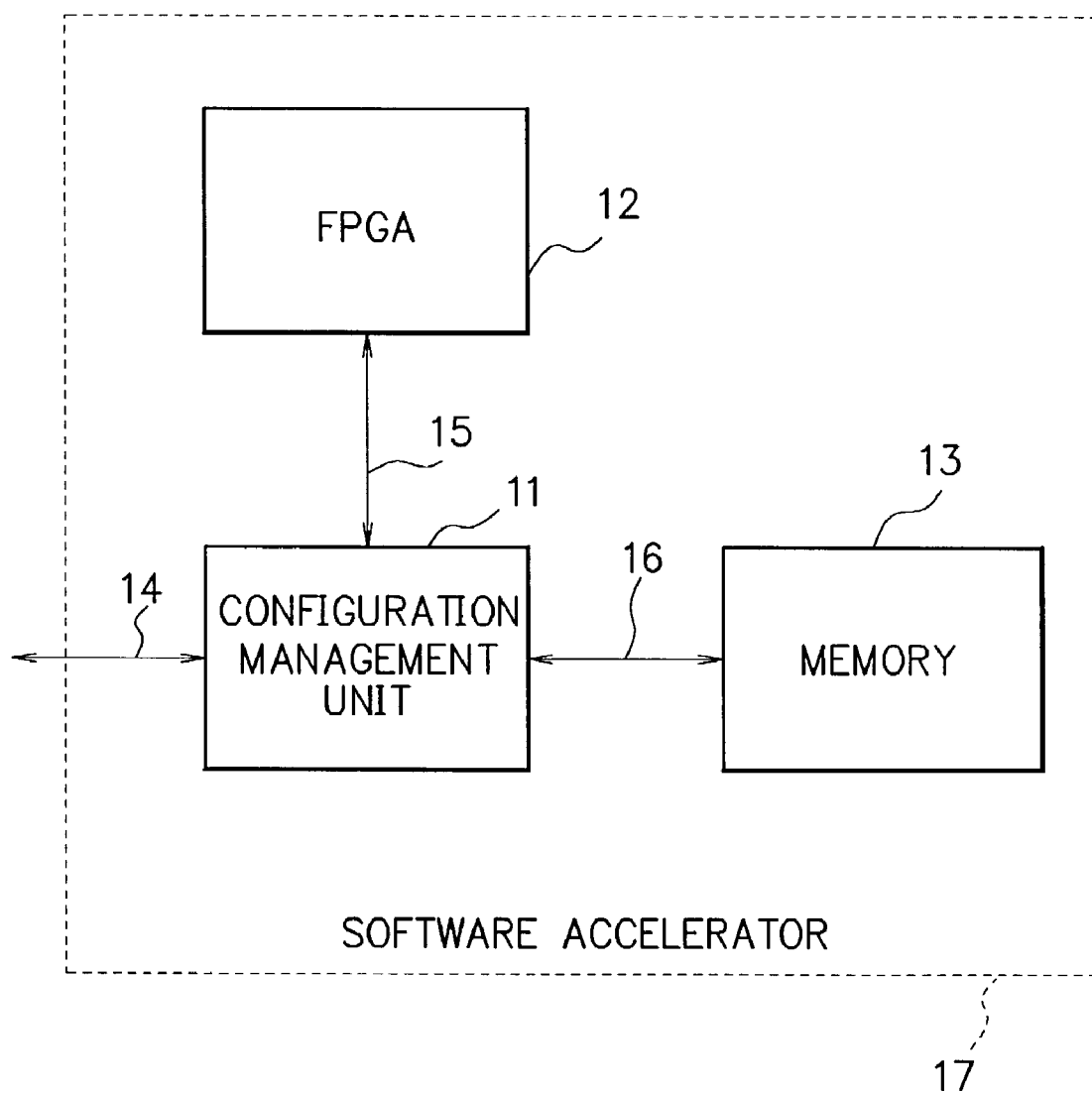
FIG. 1 is a block diagram showing a configuration of a software accelerator to which a system for managing a configuration of a variable function information processing circuit according to a first embodiment is applied.

FIG. 1 is a block diagram showing a configuration of a basic part of a software accelerator 17 to which a system for managing a configuration of a variable function information processing circuit according to the first embodiment of the present invention is applied.

In FIG. 1, the software accelerator 17 is composed of a configuration management unit 11, an FPGA (Field Programmable Gate Array) 12, a memory 13, a signal line group 14 connected to the circuit management unit 11 and the outside (an outer unit and the like not shown) respectively, a signal line group 15 connected to the configuration management unit 11 and the FPGA 12 respectively, and a signal line group 16 connected to the configuration management unit 11 and the memory 13.

As the configuration management unit 11, a semiconductor arithmetic circuit may be used or a CPU which operates according to predetermined software supplied to the CPU may be used as long as a predetermined desired configuration management system of the present invention is realized.

The FPGA 12 is one example of a variable function information processing circuit whose circuit configuration is variable, and it is needless to say that the FPGA or a CPU or a PLD (Programmable Logic Device) may be used as long as it is an information processing circuit whose circuit configuration is variable. Further, one FPGA 12 or a plurality of the FPGAs 12 may be provided.

The memory 13 is one example of a unit for storing a configuration management information group, which will be described later. Incidentally, it is needless to say that the memory 13 may be realized by, for example, an SRAM, a hard disk, a CD-ROM, a ROM, and other storage units.

Figure 2:
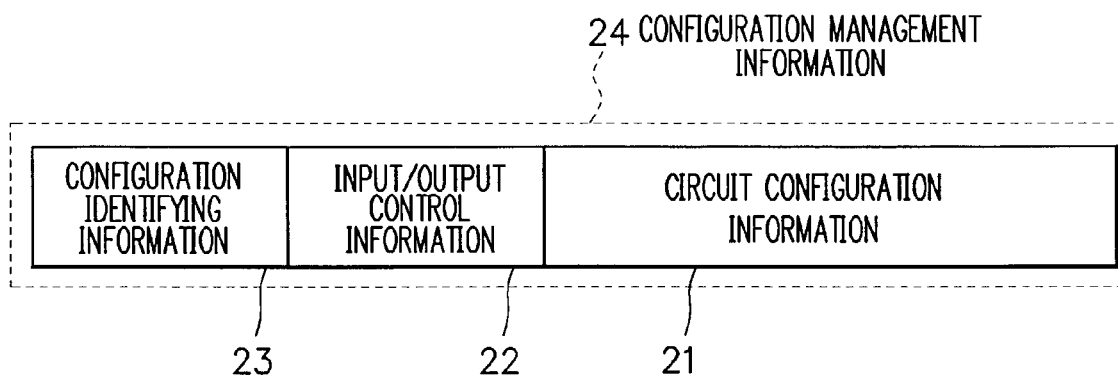
FIG. 2 is a diagram showing the detailed structure of configuration management information composing a configuration management information group stored in a memory 13.

FIG. 2 is a diagram showing the detailed structure of configuration management information composing the configuration management information group which is stored in the memory 13 shown in FIG. 1.

As shown in FIG. 2, configuration management information 24 is composed of circuit configuration information 21, input/output control information 22, and configuration identifying information 23.

The circuit configuration information 21 is information showing a circuit configuration and a wiring configuration of the FPGA 12, and information for changing a function of the FPGA 12. The input/output control information 22 is information such as a parameter and the setting value which is necessary for controlling signals of data, instructions, and the like when the signals are inputted/outputted via the signal line group 15 to/from a function circuit constituted by the FPGA 12 according to the circuit configuration information 21. The configuration identifying information 23 is information used in retrieving specified configuration management information out of a plurality of the configuration management information stored in the memory 13.

Incidentally, although only the circuit configuration information 21, the input/output control information 22, and the configuration identifying information 23 are used as the configuration management information in the example shown in FIG. 2, additional information such as, for example, a type of the FPGA may be naturally added other than the above information.

Figure 3:
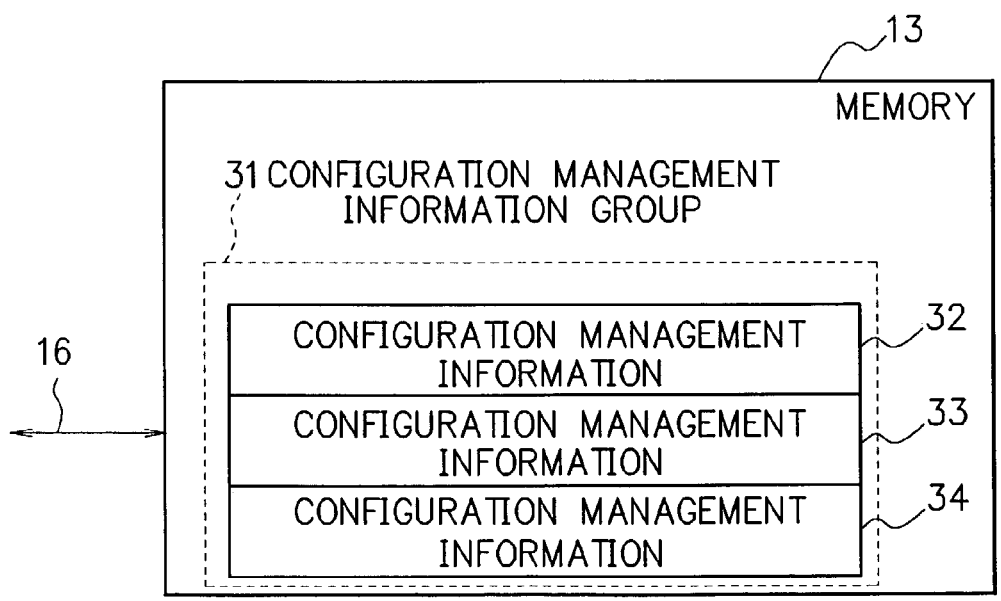
FIG. 3 is a diagram showing a configuration management information group 31 stored in the memory 13.

FIG. 3 is a diagram showing a configuration management information group 31 stored in the memory 13.

In FIG. 3, the configuration management information group 31 is composed of first configuration management information 32, second configuration management information 33, and third configuration management information 34, and each of the first to third configuration management information 32 to 34 described above has the circuit configuration information 21, the input/output control information 22, and the configuration identifying information 23 as shown in FIG. 2.

In the configuration management information group 31 stored in the memory 13, any of the configuration management information 32 to 34 composing the configuration management information group 31 can be accessed from the configuration management unit 11 via the signal line group 16, and further, the circuit configuration information 21, the input/output control information 22, and the configuration identifying information 23 in the configuration management information 32 to 34 can be also accessed selectively.

For example, the configuration management unit 11 can access all of the information (the circuit configuration information 21, the input/output control information 22, and the configuration identifying information 23) in the configuration management information 32 via the signal line group 16 to read all of the information, and can also access only the configuration identifying information 23 in the configuration management information 32 to read only the configuration identifying information 23.

Further, it is also possible to newly add configuration management information to the configuration management information group 31 from the configuration management unit 11 via the signal line group 16. However, of course, it is acceptable that new configuration management information cannot be written when a read-only storage unit such as the CD-ROM is used as the memory 13.

Furthermore, when the storage unit such as the CD-ROM is used as the memory 13, the configuration management information group 31 can be easily replaced according to the type and the structure of the FPGA 12. The case in which the CD-ROM is used as the memory 13 is explained here, but it is needless to say that, the replacement may be performed via a flexible disk, a network, and the like, not limited to the CD-ROM.

Incidentally, although the configuration management information group 31 composed of the three configuration management information 32 to 34 is shown in FIG. 3, it is natural that the configuration management information group 31 is composed of a plurality of the configuration management information and not limited to the three configuration management information. Further, needless to say, the present invention is also not limited by the arrangement, sequence, and the like of the configuration management information in the configuration management information group 31.

Figure 4:
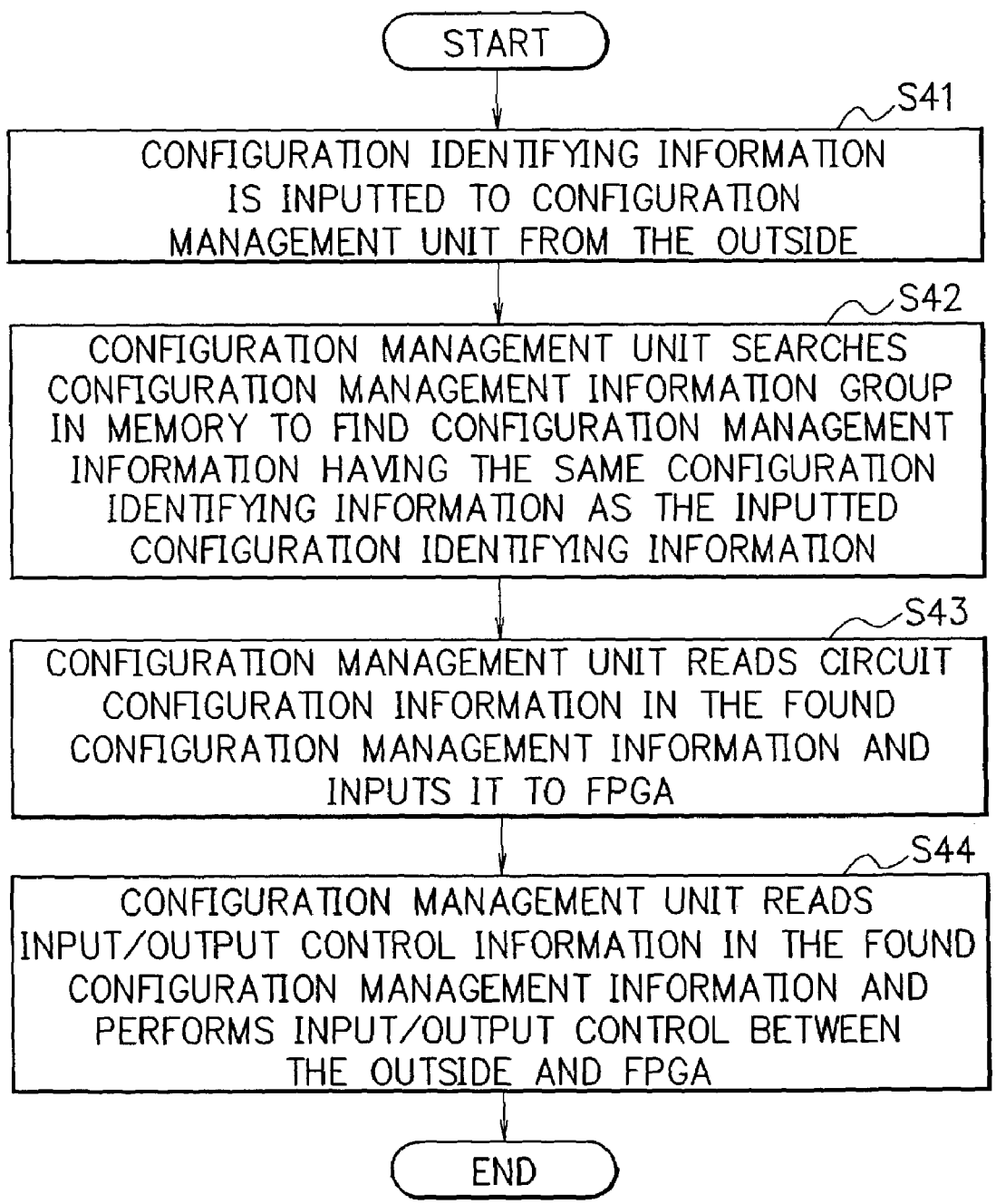
FIG. 4 is a flow chart showing the processing operation of a configuration management unit 11 in the first embodiment.

FIG. 4 is a flow chart showing the processing operation of the configuration management unit 11 in the first embodiment, and the processing operation shown in FIG. 4 is one of the basic operations performed by the software accelerator 17.

First, in step S41, desired configuration identifying information is inputted from the outside (the outer unit and the like not shown) via the signal line group 14 to the configuration management unit 11.

In step S42, the configuration management unit 11 compares the configuration identifying information inputted from the outside in step S41 described above with each of the configuration identifying information 23 of the configuration management information which compose the configuration management information group 31 stored in the memory 13. As a result, the configuration management unit 11 retrieves configuration management information having configuration identifying information which is coincident with the configuration identifying information inputted from the outside, out of the configuration management information composing the configuration management information group 31.

When the configuration management unit 11 finds the configuration identifying information coincident with the configuration identifying information inputted from the outside in step S42 described above, the configuration management unit 11 reads circuit configuration information of the configuration management information having the configuration identifying information in step S43. Further, the configuration management unit 11 inputs the read circuit configuration information to the FPGA 12 via the signal line group 15 so that the circuit configuration of the FPGA 12 is altered and the function of the FPGA 12 is changed.

In step S44, the configuration management unit 11 reads input/output control information of the configuration management information having the configuration identifying information which is coincident with the configuration identifying information inputted from the outside, and, according to the read input/output control information, outputs a signal inputted from the outside via the signal line group 14 to the FPGA 12 via the signal line group 15. Further, in this step S44, the configuration management unit 11 also outputs a signal inputted from the FPGA 12 via the signal line group 15 to the outside via the signal line group 14 according to the read input/output control information.

As stated above, the configuration management unit 11 performs the processing operation shown in FIG. 4 so that it becomes possible to alter the circuit configuration of the FPGA 12 in the software accelerator 17 and change the function thereof only by designating and inputting the configuration identifying information from the outside to the software accelerator 17 to thereby perform desired data processing in the FPGA 12.

Here, a data form of the desired configuration identifying information inputted to the configuration management unit 11 from the outside via the signal line group 14 and a data form of the configuration identifying information in the configuration management information stored in the memory 13 need not be always the same as long as certain conversion rules are prescribed in which one of the configuration management information stored in the memory 13 corresponds to the configuration identifying information inputted from the outside to the configuration management unit 11.

FIG. 5 is a diagram showing one configuration example of a system in which the software accelerator 17 shown in FIG. 1 is used in connection to a computer so that it can communicate with the computer.

In FIG. 5, 52 denotes a CPU, 53 a memory, and 54 a peripheral circuit, and the software accelerator 17, the CPU 52, the memory 53, and the peripheral circuit 54 are connected by a signal line group 55 so that they can communicate with each other.

Figure 6A:
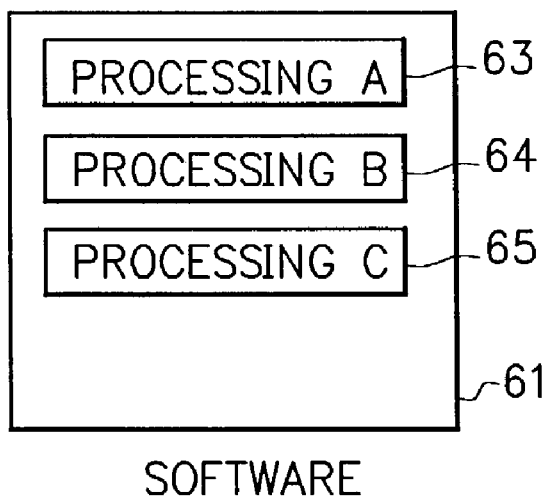
FIG. 6A is a diagram showing software 61 stored in a memory 53.
Figure 6B:
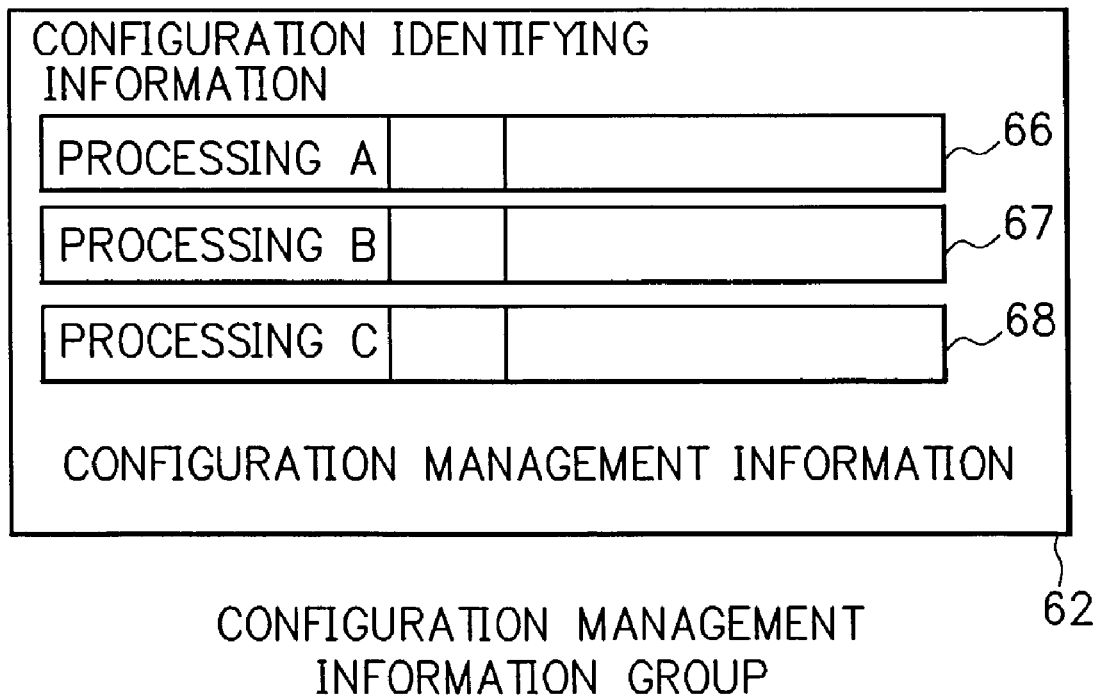
FIG. 6B is a diagram showing a configuration management information group 62 stored in the memory 13 in the software accelerator 17.

FIG. 6A is a diagram showing software 61 which is stored in the memory 53 shown in FIG. 5, and FIG. 6B is a diagram showing a configuration management information group 62 stored in the memory 13 in the software accelerator 17.

The software 61 shown in FIG. 6A is an instruction group described in a computer language (for example, the C language and the like) and composed of, for example, three sequential groupings of processing (processing A63, B64, and C65), and processing is supposed to be executed in sequence of the processing A63, the processing B64, and the processing C65.

Further, the configuration management information group 62 in the software accelerator 17 shown in FIG. 6B is supposed to be composed of configuration management information 66 to 68. Incidentally, it is needless to say that the number of the configuration management information need not be limited to three and configuration management information irrelevant to the software 61 may be additionally included other than the three information.

Here, the processing A63 shown in FIG. 6A is a series of instruction group information executed by the CPU 52 shown in FIG. 5, and the configuration management information 66 shown in FIG. 6B is information necessary for processing executed in the FPGA 12. Processing A executed by the CPU 52 according to the processing A63 and processing executed by the FPGA 12 according to the configuration management information 66 should obtain the same result as a consequence of respective processing by the CPU 52 and the FPGA 12. Therefore, information for identifying the processing A is contained in configuration identifying information in the configuration management information 66.

Furthermore, similarly, the processing B64 and the configuration management information 67, and, the processing C65 and the configuration management information 68 should obtain the same result as consequence of respective processing, and information for identifying the processing B and the processing C is contained in configuration identifying information in the configuration management information 67 and 68 respectively.

Figure 7:
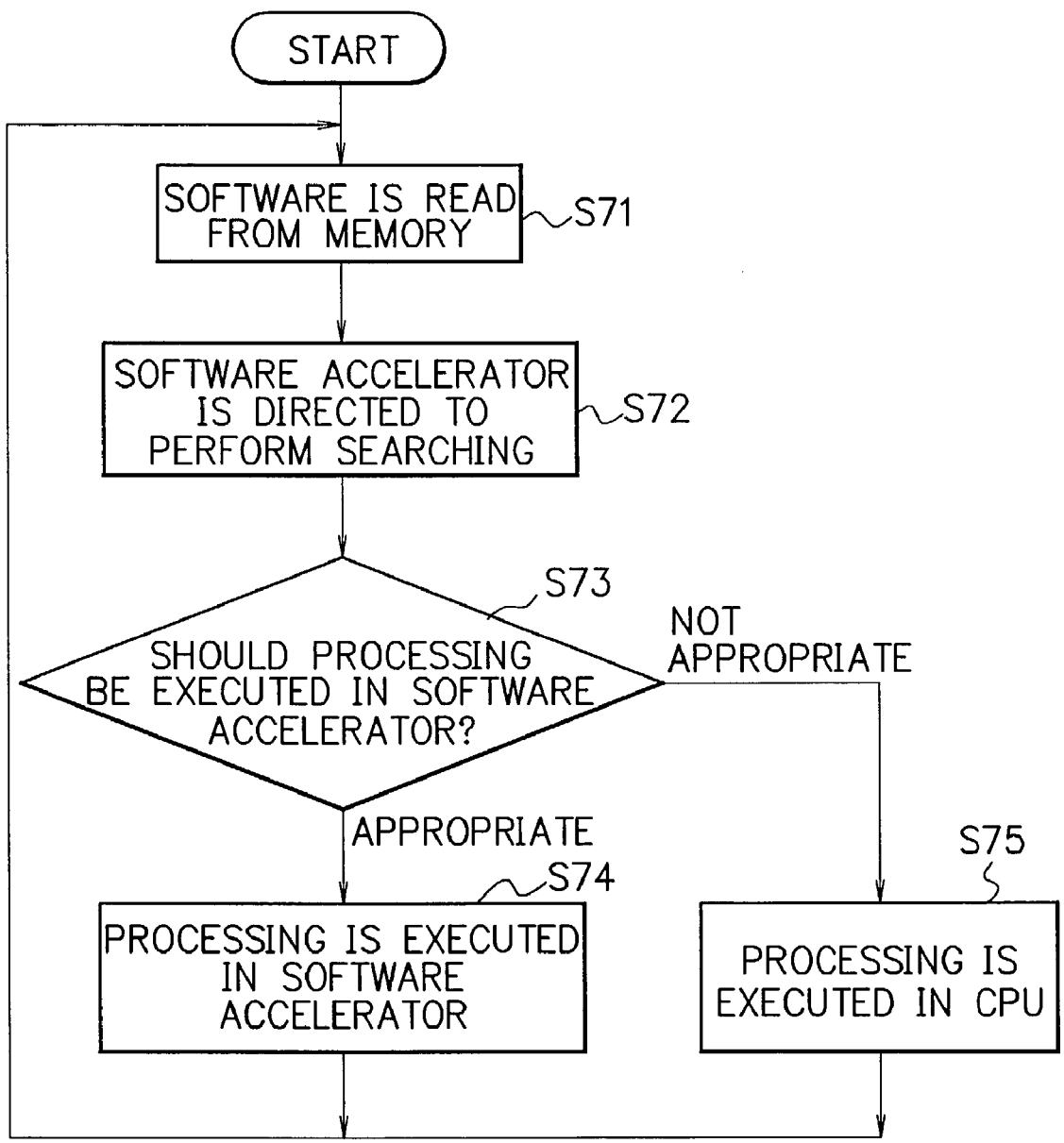
FIG. 7 is a flow chart showing the operation of the system in which the software accelerator 17 is connected to the computer so that they can communicate with each other in the first embodiment.

Here, the operation of the system shown in FIG. 5 will be explained with reference to a flow chart shown in FIG. 7.

In the operation as a normal computer, the CPU 52 first reads the processing A63 in the software 61 stored in the memory 53 and sequentially executes the series of instruction groups described in the read processing A63.

Then, the CPU 52 repeats the processing as described above from the processing A63 to the processing C65 so that processing with the software 61 is completed.

On the other hand, when the software accelerator 17 is used, the CPU 52 first reads the processing A63 in the software 61 stored in the memory 53 (S71). Next, the CPU 52 supplies configuration identifying information for retrieving the processing A to the software accelerator 17, and the configuration management unit 11 in the software accelerator 17 retrieves configuration management information, which has the supplied configuration identifying information, from the configuration management information group 62 stored in the memory 13 (S72).

When the configuration management unit 11 in the software accelerator 17 finds the configuration management information having the supplied configuration identifying information of the processing A, it means that the processing can be executed in the software accelerator 17. Based on this state, it is determined, for example, statistically whether the processing A should be processed in the software accelerator 17 or in the CPU 52 by software in consideration of processing time including time for transmitting the circuit configuration information and data, power consumption, and so on. If it is determined that it is appropriate to execute the processing A in the software accelerator 17, the configuration management unit 11 notifies the CPU 52 that the processing A should be processed in the software accelerator 17 (S73). When the CPU 52 is notified from the software accelerator 17 that the processing A should be processed in the software accelerator 17, the CPU 52 inputs/outputs data to be processed to/from the configuration management unit 11 so that the processing A is executed in the software accelerator 17, not in the CPU 52 (S74).

On the other hand, if the CPU 52 is notified from the software accelerator 17 that it is not appropriate to execute the processing A in the software accelerator 17 in step S73, the CPU 52 executes the processing A by the software 61 as normally done (S75).

Subsequently, the similar operation is repeatedly performed also for the processing B64 and the processing C65.

Incidentally, it is needless to say that, here, reading of the software (S71), direction for retrieving (S72), control of the data to be processed (S74), and the like may be performed not by the CPU 52 but by the configuration management unit 11 in the software accelerator 17, the peripheral circuit 54 shown in FIG. 5, and the like.

As explained above, according to the first embodiment, information processing by software, which has been conventionally executed in a CPU, can be replaced by information processing by hardware in real time. Further, in the information processing by hardware, a system developer can perform information processing in a form specified to specifications of a system owing to a circuit design in which architectures such as a parallel characteristic of the processing and the bus width are considered.

As a result, execution speed of information processing becomes higher and verification time, which occupies most of a software development period, can be shortened. Accordingly, the aforesaid first embodiment can shorten the software development period.

Second Embodiment

Next, a second embodiment of the present invention will be explained.

FIG. 8 is a block diagram showing a configuration example of a system to which a system for managing the configuration of the variable function information processing circuit according to the second embodiment of the present invention is applied.

In FIG. 8, 81 denotes a software accelerator having an internal configuration similar to that of the above-described software accelerator 17 shown in FIG. 1. 82 denotes a peripheral circuit composed of an input/output circuit from/to the outside, various control circuits, and the like. The software accelerator 81 and the peripheral circuit 82 are connected by a signal line group 83 so that they can communicate with each other.

A configuration management information group in the software accelerator 81 is composed of the minimum configuration management information necessary for the operation such as configuration management information for controlling the peripheral circuit 82 and for processing data supplied from the peripheral circuit 82. By preparing only the necessary amount of the configuration management information as described above, a storage region in the software accelerator 81 can be effectively utilized without wasting the storage region.

Further, by using the minimum necessary configuration management information, the FPGA 12 in the software accelerator 81 shifts the function (circuit configuration) according to the configuration management information read and supplied from the memory in the software accelerator 81 by a function management unit, which eliminates the configuration of a wasteful circuit which is not used at all during certain time.

The similar effect is obtained even in a case in which only one FPGA 12 is provided in the software accelerator 81. Naturally, the similar effect is obtained also when a plurality of the FPGAs 12 are provided.

As explained above, according to the second embodiment, in addition to the effect obtained by the first embodiment, all of the processing is executed by hardware so that designing with a high degree of efficiency can be realized in software development.

Third Embodiment

Subsequently, a third embodiment of the present invention will be explained.

It should be noted that, in the third embodiment of the present invention to be explained below, configurations of a software accelerator and a system using the software accelerator in connection to a computer so that they can communicate with each other are similar to the configurations shown in FIG. 1 and FIG. 5 respectively, and repeated explanations thereof will be omitted.

Figure 9:
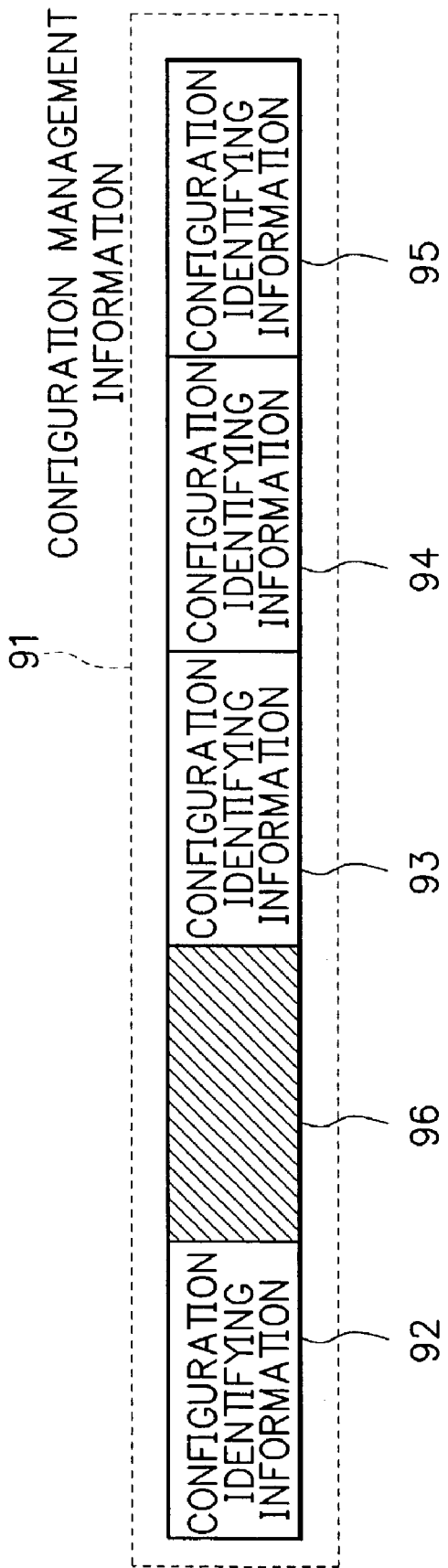
FIG. 9 is a diagram showing the detailed structure of one configuration management information in a configuration management information group stored in a memory 13 in a third embodiment.

FIG. 9 is a diagram showing the detailed structure of one of configuration management information in a configuration management information group stored in the memory 13 in the third embodiment.

As shown in FIG. 9, configuration management information 91 is composed of configuration identifying information 92 and a series of configuration identifying information 93 to 95, and invalid idle information 96 is inserted between the configuration identifying information 92 and the configuration identifying information 93 in order to create the same information (data) form as that of the configuration management information 24 shown in the first embodiment as described above.

Incidentally, although the configuration management information 91 having the three configuration identifying information as the series of the configuration identifying information 93 to 95 is shown as one example in FIG. 9, it is needless to say that the number of the series of the configuration identifying information is not limited to three. Further, naturally, additional information such as the type of the FPGA may be added to the configuration management information 91.

FIG. 10 is a diagram showing a configuration management information group 101 stored in the memory 13 in the third embodiment.

In FIG. 10, the configuration management information group 101 is composed of first configuration management information 102, second configuration management information 103, third configuration management information 104, and fourth configuration management information 105. The first to third configuration management information 102 to 104 described above are the configuration management information similar to the configuration management information 66 to 68 shown in FIG. 6B in the aforesaid first embodiment, and repeated explanations thereof will be omitted.

The configuration management information 105 allows total processing D executed by processing A to processing C to be registered as one configuration management information. For example, the configuration management information 105 is composed of configuration identifying information 106 for the processing D, configuration identifying information 107 for the processing A, configuration identifying information 108 for the processing B, and configuration identifying information 109 for the processing C.

For example, when processing is executed in the FPGA 12 according to the configuration management information 105 which defines processing executed in sequence of the processing A→the processing B→and the processing C as the processing D, the processing is executed in the FPGA 12 according to the configuration management information in sequence of "the configuration management information 102 having the configuration identifying information for the processing A"→"the configuration management information 103 having the configuration identifying information for the processing B"→"the configuration management information 104 having the configuration identifying information for the processing C". In other words, when the configuration identifying information 106 for the processing D is inputted from the outside to the configuration management unit 11, the configuration management unit 11 retrieves and reads the configuration management information 105 having the configuration identifying information 106 for the processing D. Then, the configuration management unit 11 sequentially retrieves and reads the first to third configuration management information 102 to 104 having the configuration identifying information 107 for the processing A, the configuration identifying information 108 for the processing B, and the configuration identifying information 109 for the processing C, which are described in the read configuration management information 105, and executes the processing in the FPGA 12 according to the first to third configuration management information 102 to 104.

As explained above, according to the third embodiment, since a plurality of configuration management information is called according to the configuration management information, a plurality of small-scale processing are grouped into large-scale processing, and therefore, for example, a plurality of processing which are constantly performed in predetermined sequence can be handled as one processing, which enables the system developer to perform development easily, and to shorten the software development period.

Incidentally, although the configuration management information group 101 stored in the memory is composed of the four configuration management information 102 to 105 in FIG. 10, it is needless to say that the configuration management information group 101 is composed of a plurality of the configuration management information and not limited to the four configuration management information.

INDUSTRIAL APPLICABILITY

As described above, according to the present invention, information processing by software, which has been conventionally performed by successively executing an instruction group in a CPU, is replaced by information processing by hardware in real time, and it becomes possible to execute information processing using the hardware, and further to execute information processing using a circuit configuration of the hardware specified to development specifications so that execution speed of the information processing can be made higher and verification time of developed software can be shortened. Accordingly, it will become possible to shorten a software development period and to design software with a high degree of efficiency.

What is claimed is:

1. A system for managing a configuration of a variable function information processing circuit, whose circuit configuration is variable according to circuit configuration information defining the circuit configuration and whose circuit configuration is capable of executing the same processing which is executed by software in a processor, comprising:
    a storage part storing configuration management information having the circuit configuration information, input/output control information defining control of an input/output signal in a circuit configuration according to the circuit configuration information, and first configuration identifying information identifying the circuit configuration information;
    an interface part connecting the system to said processor;
    an information reading part reading the configuration management information stored in said storage part and corresponding to an instruction group described in a computer language and executable by said processor;
    a determining part determining whether the processing will be processed in the variable function information processing circuit or by software in the connected processor based on whether the variable function information processing circuit or the software will provide a better processing time for the instruction group;
    a processing executing part altering the circuit configuration of the variable function information processing circuit according to the configuration management information read by said information reading part when the determining part determines that the variable function information processing circuit will provide a better processing time, and executing processing of the instruction group in the variable function information processing circuit.

2. The system for managing the configuration of the variable function information processing circuit according to claim 1, wherein said information reading part reads the configuration management information corresponding to the instruction group out of the configuration management information stored in said storage part based on the first configuration identifying information.

3. The system for managing the configuration of the variable function information processing circuit according to claim 1, wherein said storage part stores, for each of the command groups, a configuration management information group composed of a plurality of the different configuration management information for each of the instruction groups, and wherein said information reading part reads configuration management information corresponding to each of the instruction groups from said storage part.

4. The system for managing the configuration of the variable function information processing circuit according to claim 1, further comprising a storage part for storing configuration sequence information having a configuration identifying information group grouped by sequencing a plurality of the first configuration identifying information and second configuration identifying information identifying the configuration identifying information group,
    wherein said information reading part reads configuration sequence information corresponding to each of the instruction groups from said storage part, and further reads a plurality of configuration management information according to sequence based on the read configuration sequence information.

5. The system for managing the configuration of the variable function information processing circuit according to claim 4, wherein, every time the configuration management information is read by said information reading part, said processing executing part alters the circuit configuration of the variable function information processing circuit according to the read configuration management information, and executes the processing of the instruction group in the variable function information processing circuit.

6. The system for managing the configuration of the variable function information processing circuit according to claim 1, wherein the number of the variable function information processing circuit is one.

7. A method for managing a configuration of a variable function information processing circuit whose circuit configuration is variable according to circuit configuration information defining the circuit configuration and whose circuit configuration is capable of executing the same processing which is executed by software in a processor, comprising:
    an interfacing step of interfacing the configuration of the variable function information processing circuit with said processor;
    an information reading step of reading configuration management information having the circuit configuration information, input/output control information defining control of an input/output signal in a circuit configuration according to the circuit configuration information, and first configuration identifying information identifying the circuit configuration information, which corresponds to an instruction group described in a computer language and executable by said processor, from a storage part in which the configuration management information is stored;
    a determining step to determine whether the processing will be processed in the variable function information processing circuit or by software in the connected processor based on whether the variable function information processing circuit or the software will provide a better processing time for the instruction group; and
    when the variable function information processing circuit is determined to provide a better processing time, a processing executing step of altering the circuit configuration of the variable function information processing circuit according to the configuration management information read in said information reading step, and executing processing of the instruction group.

8. The method for managing the configuration of the variable function information processing circuit according to claim 7, wherein, in said information reading step, the configuration management information corresponding to the instruction group is read from the storage part based on the first configuration identifying information.

9. A method for managing a configuration of a variable function information processing circuit whose circuit configuration is variable according to circuit configuration information defining the circuit configuration and whose circuit configuration is capable of executing the same processing which is executed by software in a processor, comprising:

an interfacing step of interfacing the configuration of the variable function information processing circuit with said processor;

an information reading step of reading configuration sequence information corresponding to an instruction group described in a computer language and executable by said processor from a storage part for storing configuration management information including the circuit configuration information, input/output control information defining control of an input/output signal in a circuit configuration according to the circuit configuration information, and first configuration identifying information identifying the circuit configuration information, and the configuration sequence information including a configuration identifying information group which is grouped by sequencing a plurality of the configuration identifying information and second configuration identifying information identifying the configuration identifying information group, and of further reading a plurality of configuration management information according to sequence based on the read configuration sequence information;

a determining step to determine whether the processing will be processed in the variable function information processing circuit or by software in the connected processor; and when the variable function information processing circuit is determined to provide a better processing time, a processing executing step of, every time the configuration management information is read in said information reading step, altering the circuit configuration of the variable function information processing circuit according to the read configuration management information, and executing processing of the instruction group.

* * * * *